United States Patent
Eggensperger et al.

[15] 3,676,471
[45] July 11, 1972

[54] 4-(BETAHYDROXYETHOXY-2-HYDROXY-BENZOPHENONES) AND ESTERS THEREOF

[72] Inventors: Heinz Eggensperger, Gadernheim uber Bensheim; Volker Franzen, Heidelberg; Wilfried Kloss, Kolmbach uber Bensheim, all of Germany

[73] Assignee: Deutsche Advance Produktion GmbH, Lautern/Odenwald, Germany

[22] Filed: Oct. 28, 1968

[21] Appl. No.: 771,272

[30] Foreign Application Priority Data

Dec. 21, 1967 Germany..................P 16 43 307.1

[52] U.S. Cl. ...........260/410.5, 260/45.85, 260/45.9 R, 260/45.95, 260/457, 260/465 D, 260/465 R, 260/469, 260/470, 260/476 R, 260/481, 260/485 G, 260/486 R, 260/487, 260/488 CD, 260/946, 260/591
[51] Int. Cl. ..........C07c 69/28, C07c 49/82, C08f 45/58
[58] Field of Search ............260/410.5, 591, 45.85, 488 CD, 260/485 G, 476 R, 469 US, 486 R

[56] References Cited

UNITED STATES PATENTS

| | | | |
|---|---|---|---|
| 2,448,767 | 9/1948 | Carlson | 260/284 |
| 2,980,647 | 4/1961 | Lappin | 260/45.85 |
| 3,202,716 | 8/1965 | Goldberg et al. | 260/591 |
| 3,341,493 | 9/1967 | Goldberg et al. | 260/47 |
| 2,675,367 | 4/1954 | Caldwell | 260/47 |
| 3,322,817 | 5/1967 | Goldberg et al. | 260/475 |
| 3,086,988 | 4/1963 | Gordon | 260/488 |
| 3,313,866 | 4/1967 | Horton et al. | 260/880 |

*Primary Examiner*—Lewis Gotts
*Assistant Examiner*—Diana G. Rivers
*Attorney*—Christen & Sabol

[57] ABSTRACT

Compounds of the formula

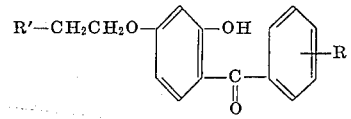

wherein R is hydrogen, alkyl or aryl and R' is hydrocarbyl acyloxy, said compounds being useful for light-stabilization of polymeric compositions.

8 Claims, No Drawings

4-(BETAHYDROXYETHOXY-2-HYDROXY-BENZOPHENONES) AND ESTERS THEREOF

The invention concerns new compositions of the benzophenone series, which are suited as light stabilizers for polymers, new intermediates for forming such new compositions and methods for preparing same.

It is known to add UV absorbers to polymers for protection against the detrimental effects of light. The best known products used for this purpose are, possibly compounds of the benzophenone or benzotriazole series substituted with halogen or alkoxy groups.

In practice it has been found that the stabilizing effects of these UV absorbers can be substantially increased if their characteristics such as volatility, solubility, etc. are adapted as far as possible to the specific requirements in each case, to the extent permitted by the preparation and other characteristics of the polymer to be stabilized. The above-mentioned known compounds of the benzophenone and benzotriazole series allowed such adaptation only to an insufficient extent, because the variation possibilities of these systems were very limited and confined only to the use of alkyl groups and halogens.

It was found that the variation capability of the compounds of the benzophenone series can be greatly expanded and that new and very effective light stabilizers can be prepared if 2,4-dihydroxybenzophenone of formula I is reacted in the presence of basic catalysts, preferably alkali or alkaline earth metal carbonates or alcoholates, and organic solvents with ethylene carbonate or ethylene oxide, to produce compounds of formula II according to the following equation:

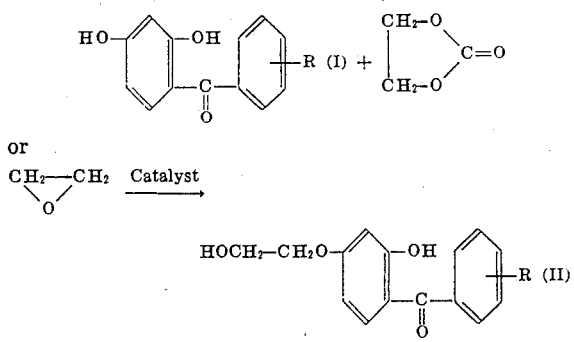

wherein R is hydrogen, an alkyl group of one to 18 carbon atoms or an aryl group of 6 to 18 carbon atoms. The reaction is preferably carried out in a dialkyl ketone as solvent.

It was surprising to discover that in this reaction the hydroxyl group in the 4 position almost exclusively reacted. The compound of formula II obtained thereby can be chemically modified much more widely than previously known light stabilizers of the benzophenone and benzotriazole series and can, therefore, also be better adapted to the specific requirements of the system to be stabilized. The modification for obtaining best results is obtained by etherification or esterification of the aliphatic hydroxyl group of compound II with organic alcohol radicals or organic or inorganic acids. According to the choice of etherification or esterification agent the compatibility, volatility and/or extractability of the final product can be easily changed to the desired degree.

As organic acids the following can be used according to the invention: straight chain or branched, saturated or unsaturated, monocarboxylic or polycarboxylic acids, which can be substituted by thioether groups, halogens, other functional groups such as cyano or hydroxyl groups and/or phenol groups substituted by hydroxyl groups, or aromatic acids.

Some examples of the esters of compound II with organic acids are: benzoic acid ester, 2,6-dimethyl-4-hydroxybenzylthioglycolic acid ester, crotonic acid ester, bis-(thiodipropionic acid) ester, and cyanoacetic acid ester of the 4-(beta-hydroxyethoxy-2-hydroxybenzophenone).

Some examples of inorganic acids that can be used are hydrohalogenic acids, e.g., hydrochloric acid and hydrobromic acid, hydrocyanic acids, phosphoric acid and sulfuric acid.

By the use of monovalent inorganic acids or monocarboxylic acids to esterify compound II; or by etherification of the corresponding halide, i.e., formula III below wherein R' is halogen, e.g., chlorine, with an organic etherifying agent, e.g., sodium, potassium or other alkali metal alkoxides; or by reaction of such corresponding halides with phosphites or salts of the formula, $(R''O)_3P$ or $(R''O_2)POM$ wherein R'' is alkyl, cycloalkyl or aryl and M is alkali metal, for example; there are obtained compounds of the formula:

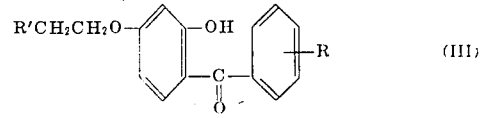

wherein R' is a monovalent acid, alcohol or phosphonate radical such as the halogen, the cyano, or the acyloxy group derived from the monovalent acid, or the alkoxy, cycloalkoxy or aryloxy group derived from the monohydric alcohol or the phosphonate radical $(R''O)_2P(O)-$. The above-mentioned acyloxy, alkoxy, cycloalkoxy and aryloxy groups can be unsubstituted or substituted with halogen, cyano, hydroxyl, hydroxyaryl, e.g., hydroxyphenyl, or thioether groups. Preferably the R' group contains up to and including 18 carbon atoms; for example, where R' contains carbon atoms it, preferably contains one to 18 carbon atoms.

Examples of organic alcohol radicals represented by R' include the organoxy radicals of monohydric alcohols such as methanol, ethanol, octanol, stearyl alcohol, benzyl alcohol, cyclohexanol and other substituted and unsubstituted alcohols. Radicals of polyhydric organic alcohols are useful in linking two or more of the ethyleneoxy-substituted benzophenone groups shown in formula III.

Illustrating the process, 1 mole 2,4-dihydroxybenzophenone of formula I is suitably heated together with 2.2 moles ethylene carbonate and 10 g sodium methylate in about 700 cc dialkyl ketone for about ½ to 1 hour at about 140°C and after completion of the reaction, the reaction product is stirred into about 1 liter water. Thereupon the product is acidified with concentrated hydrochloric acid, the ketone is separated off, remaining solvent is distilled off and the residue is esterified or etherified or otherwise reacted as explained above without necessarily being subjected to further intervening treatments. The yield of final product usually amounts to about 85 percent.

The esters, ethers and phosphonates obtained according to the invention are generally suited for light stabilization of synthetic polymers such as polyolefins, polyvinyl chloride and their copolymers with other unsaturated compounds, polystyrene and its copolymers with butadiene, acrylonitrile and/or methacrylic acid esters, polyesters, polyamides as well as synthetic resin lacquers.

The stabilizers of the invention are commonly used in amounts of 0.1 to 10 percent calculated on the total weight of the polymeric material to be stabilized.

The following examples are presented.

EXAMPLE 1

Stearic acid ester of 4-(beta-hydroxyethoxy-2-hydroxybenzophenone) — Stabilizer 1

855 g (4 moles) 2,4-dihydroxybenzophenone were heated together with 800 g (9 moles) ethylene carbonate and 50 g sodium methylate in 400 cc diisobutyl ketone for 50 minutes at 140°C, quickly cooled to room temperature and stirred into 3 liters water. After acidifying with concentrated HCl the ketone was separated out and the aqueous phase washed twice, each time with 500 cc dichlorethane. The organic phases were combined, the solvent distilled off in vacuum. The residue was a compound having the formula II wherein R is hydrogen. The residue was heated under reflux for 3 hours for esterification with 1,200 g (4.2 moles) stearic acid in 1.5 liters toluene with the addition of 20 g p-toluenesulfonic acid as catalyst. The toluene was washed with water, dried and distilled off in vacuum. The residue was dissolved in 2 liters hot isopropanol and again precipitated out by beginning the crystallization with 12 liters methanol. The yield was 1930 g of the stearic acid ester of the formula III wherein R' is stearoyloxy and R is hydrogen. This was a yield of 92.5 percent of the theoretical, calculated on the 2,4-dihydroxy benzophenone used. Melting point was 66° to 68°C.

EXAMPLE 2

Propionic acid ester of 4-(beta-hydroxyethoxy)-2-hydroxy-4'-phenylbenzophenone — Stabilizer 2

58 g (0.2 mole) 2,4-dihydroxy-4'-phenylbenzophenone, 40 g (0.4 mole) ethylene carbonate and 5 g sodium methylate were heated in 400 cc diisobutyl ketone for 2 hours at 130°C. The reaction mixture after cooling was stirred in water and 10 cc concentrated HCl. The organic phase was separated out. The aqueous phase was extracted twice with methylene chloride. The solvent was distilled off in vacuum and the residue was recrystallized twice from methanol.

Yield 60 g of (4-beta-hydroxyethyoxy-2-hydroxy-4'-phenyl-benzophenone). This yield was 84 % of the theoretical. Melting point: 157° to 158°C.

By esterification of this alcohol with propionic acid by known methods such as described in Example 1, stabilizer 2 is obtained.
Yield:
108 percent, calculated on the alcohol used and
84 percent, calculated on the 2,4-dihydroxy-4'-phenyl-benzophenone used.

The compounds listed in Table 1 were obtained in an analogous manner, which compounds are characterized by their substituents R and R' with reference to the general formula III.

acid or alcohol designated in the column headed R'H in the manner set forth in Examples 1 and 2.

In the manufacture of compound 18, 2,4-dihydroxy-4'-methyl-benzophenone was used as starting material to produce the intermediate of formula II wherein R is methyl. Thereafter, the intermediate was reacted with stearic acid in the manner set forth in Examples 1 and 2.

In the manufacture of compounds 19 and 20, 2,4-dihydroxy-4'-phenyl-benzophenone was used as starting material to produce the intermediate of formula II wherein R is phenyl. Thereafter, the intermediate was reacted with, respectively, propionic acid and decanoic acid in the manner set forth in Examples 1 and 2.

EXAMPLE 3

Light stabilizing of polypropylene

To each 100 parts of unstabilized polypropylene powder there were added 0.5 parts 2,6-di-tert.butyl-p-cresol and 0.2 parts of the light stabilizers listed in Table 2 below. All these mixtures were rolled on a laboratory roll-mill at 180°C for 10 minutes. The foils obtained were then pressed in a press at a pressure of 200 atm. and a temperature of 210°C for 8 minutes. From all the 1 mm thick plates so obtained, 5 strips were cut from each. The strips were illuminated by storage in the Xenotest apparatus.

The brittleness of the samples were tested and results are given in Table 2.

TABLE 2

| Light protective agent | Brittle after hours |
| --- | --- |
| 2-hydroxy-4-octoxybenzophenone (comparison) | 1000 |
| Commercial UV absorber of triazone type (comparison) | 1000 |
| Stabilizer 1 (illustrates invention) | 1200 |

TABLE 1

| Compound Number | R | R' | R'H | Melting point, °C. | Yield, percent |
| --- | --- | --- | --- | --- | --- |
| 3 | H | $C_2H_5COO-$ | Propanoic acid | 57-58 | 85 |
| 4 | H | $C_{11}H_{23}COO-$ | Lauric acid | 52-53 | 83 |
| 5 | H | $C_{17}H_{35}COO-$ | Stearic acid | 66-68 | 92 |
| 6 | H | ⟨phenyl⟩-COO- | Benzoic acid | 97-99 | 70 |
| 7 | H | ⟨phenyl⟩-⟨phenyl⟩-COO- | 4-phenylbenzoic acid | 118-120 | 65 |
| 8 | H | HO-⟨2,6-di-CH₃-phenyl⟩-CH₂SCH₂COO- | HO-⟨2,6-di-CH₃-phenyl⟩-CH₂SCH₂COOH | 70-75 | 74 |
| 9 | H | ⟨phenyl⟩-CH=CH-COO- | Cinnamic acid | 112-114 | 80 |
| 10 | H | $CH_3-CH=CH-COO-$ | 2-butenoic acid | 83-85 | 70 |
| 11 | H | $-OOC-C\equiv C-COO-$ | 2-butynedioic acid | 148-151 | 85 |
| 12 | H | $-OOCCH_2CH_2SCH_2CH_2COO-$ | Thiodipropionic acid | 83-84 | 67 |
| 13 | H | $CNCH_2COO-$ | Cyanoacetic acid | 105-107 | 86 |
| 14 | H | $BrCH_2COO-$ | Bromoacetic acid | 57-60 | 90 |
| 15 | H | $(C_2H_5O)_2P(=O)-$ | $(C_2H_5O)_2PH(=O)$ | 94-96 | 85 |
| 16 | H | $CH_3O-$ | Methanol | 40-41 | 75 |
| 17 | H | $Br-$ | Hydrobromic acid | 90-95 | 78 |
| 18 | $CH_3$ | $C_{17}H_{35}COO-$ | Stearic acid | 66-67 | 87 |
| 19 | ⟨phenyl⟩- | $C_2H_5COO-$ | Propanoic acid | 103-104 | 84 |
| 20 | ⟨phenyl⟩- | $C_9H_{19}COO-$ | Decanoic acid | 85-86 | 81 |

In the manufacture of compounds 3 through 17, 2,4-dihydroxybenzophenone was used as a starting material to produce the intermediate of formula II wherein R is hydrogen. Thereafter, the resulting intermediate was reacted with the

EXAMPLE 4

Light stabilizing of polyvinyl chloride

To each 100 parts of PVC suspension of K value 65 there were added 2 parts of a barium/cadmium laurate stabilizer and the light protective agents indicated in Table 3. The mixtures were rolled out in the same way as described in Example 3 on a roller at 180°C for 5 minutes to 0.3 mm thick foils, which were illuminated at 55°C in the same fadeometer apparatus.

TABLE 3

| Light protective agent (0.2%) | Dark brown (decomposition) after hours given below |
|---|---|
| 2-hydroxy-4-methoxybenzophenone (comparison) | 1200 |
| Commercial UV stabilizer of triazine type (comparison) | 1400 |
| Stabilizer 2 (illustrates invention) | 1450 |

What is claimed is:

1. A compound of the formula

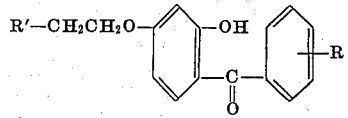

wherein, when R is selected from the group consisting of alkyl and aryl having up to 18 carbon atoms, R' is hydrocarbyl acyloxy having 10 to 18 carbon atoms and, when R is hydrogen, R' is selected from the group consisting of benzoyloxy, cinnamoyloxy, 4-phenylbenzoyloxy, and $(OOCC \equiv CCOO)_{1/2}$.

2. The compound of claim 1 wherein R is phenyl and R' is decanoyloxy.

3. The compound of claim 1 wherein R is hydrogen and R' is cinnamoyloxy.

4. The compound of claim 1 wherein R is hydrogen and R' is 4-phenylbenzoyloxy.

5. The compound of claim 1 wherein R is hydrogen and R' is benzoyloxy.

6. The compound of claim 1 wherein R is methyl and R' is stearoyloxy.

7. The compound as claimed in claim 1 wherein R is hydrogen and R' is $(-OOC-C \equiv C-COO-)_{1/2}$.

8. The compound of the formula

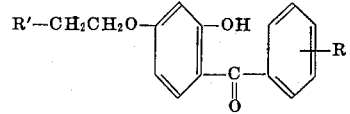

wherein R is phenyl and R' is propionyloxy.

* * * * *